United States Patent
Westersten

[11] 3,712,133
[45] Jan. 23, 1973

[54] FLOWMETER PROBE
[75] Inventor: Allan S. Westersten, Los Angeles County, Calif.
[73] Assignee: Statham Instruments, Inc., Oxnard, Calif.
[22] Filed: July 24, 1970
[21] Appl. No.: 57,903

[52] U.S. Cl. .......................... 73/194 EM, 128/205 F
[51] Int. Cl. .................................................. G01p 5/08
[58] Field of Search ....73/194 EM; 310/11; 336/225; 313/79; 128/205 F

[56] References Cited

UNITED STATES PATENTS

| | | | |
|---|---|---|---|
| 3,580,071 | 5/1971 | Hickman | 73/194 EM |
| 3,309,924 | 3/1967 | Kolin et al. | 73/194 |
| 2,167,379 | 7/1939 | Tolson | 250/157 |
| 2,208,939 | 7/1940 | Ruska | 250/157 |

FOREIGN PATENTS OR APPLICATIONS

| | | | |
|---|---|---|---|
| 1,072,521 | 6/1967 | Great Britain | 73/194 |

Primary Examiner—Jerry W. Myracle
Assistant Examiner—Arthur E. Korkosz
Attorney—Philip Subkow, George J. Netter and Kendrick and Subkow

[57] ABSTRACT

An insulative hollow cylinder, whose internal bore is slightly larger than the external dimensions of the blood vessel on which it is to be mounted, has a longitudinal portion removed to form an access opening. A first magnetizing coil is formed about the exterior of the insulative cylinder and is looped to extend circumferentially about the cylinder at substantially 180° thereof. At each side of the first magnetizing coil there is provided at least one auxiliary winding whose field axis is directed through the blood vessel. The resultant magnetic field from the first magnetizing coil and auxiliary windings is highly uniform throughout the entire cross section of the blood vessel on which the probe is mounted.

3 Claims, 5 Drawing Figures

PATENTED JAN 23 1973          3,712,133

INVENTOR
ALLAN S. WESTERSTEN
BY KENDRICK and SUBKOW

George J. Netter
ATTORNEYS.

FLOWMETER PROBE

The present invention relates generally to a blood flowmeter, and, more particularly, to a probe for mounting about a blood vessel to measure the flow rate of blood passing therethrough.

BACKGROUND OF THE INVENTION

A well known technique for determining blood flow through a vessel is to apply a magnetic field across the vessel which induces an electric signal in the blood passing therethrough. Longitudinally spaced electrodes contacting the outer vessel surface are connected to a suitable signal measuring apparatus, the magnitude of the signal measured being directly and proportionately related to the blood velocity and thus the blood flow, assuming the cross sectional area of the blood vessel to be of constant magnitude. A full description of the basic theory of operation of such flowmeters is given in the U. S. Pat. No. 3,316,762, APPARATUS AND PROCESS FOR MEASURING FLUID FLOW, by Allan S. Westersten, issued on May 2, 1967.

Large so-called Helmholtz coils have been located externally of the body for applying a magnetic field to a blood vessel within the body in early flowmeters. Although the use of Helmholtz coils insures a uniform field applied to the blood vessel, and thus to the blood contained therein, it has been found that much more accurate results are obtained and repeatability improved if the magnetic field generator is carried on a probe which is directly applied about the blood vessel.

A satisfactory blood flowmeter probe should have a sufficiently large access opening in order to permit it being received onto the blood vessel without damaging it in the process. Also, the probe should not be so heavy as to cause trauma when in place during use. For operation purposes, the probe needs to be able to produce a relatively strong magnetic field in order to induce a signal within the blood flowing through the vessel which is significantly greater than electrical noise usually encountered in taking such measurements.

All known prior probes have been unsatisfactory in one or more of the above noted respects, or in other regards. For example, certain probes, in order to produce a sufficiently strong magnetic field have incorporated relatively heavy iron cores within an energizing coil which has increased the weight prohibitively. With other probes, in order to overcome the difficulty in mounting the probe to a blood vessel, relatively large access openings have been provided which inherently resulted in the production of a magnetic field which was objectionably not uniform across the blood vessel.

It is therefore a primary aim and object of the present invention to provide an improved flowmeter probe for mounting directly onto a blood vessel, having a magnetic field generator which produces a highly uniform field across the blood vessel.

A further object is the provision of a flowmeter probe which has a generous access opening permitting ready adaptation about a blood vessel.

Another object is the provision in a flowmeter probe of a plurality of magnetic field generating windings selectively distributed to form a uniform field across a blood vessel.

SUMMARY OF THE INVENTION

In the practice of the present invention, an insulative hollow cylinder, whose internal bore is slightly larger than the external dimensions of the blood vessel on which it is to be mounted, has a longitudinal portion removed to form an access opening. A first magnetizing coil is formed about the exterior of the insulative cylinder and is looped to extend circumferentially about the cylinder for substantially 180° thereof. At each side of the first magnetizing coil, adjacent the extremities thereof, there are provided at least one auxiliary winding whose field axis is directed through the blood vessel and poled to reinforce the field within the blood vessel. The resultant magnetic field from the first magnetizing coil and auxiliary windings is highly uniform throughout the entire cross-section of the blood vessel on which the probe is mounted. The magnetizing coil and auxiliary windings are series connected such that when provided with excitation voltage induced signals produced in the blood flowing through the vessel are functionally representative of the blood flow rate.

A first induced signal electrode is located at one side of the vessel and a second electrode at a diametrically opposed point of the vessel.

DESCRIPTION OF A PREFERRED EMBODIMENT

Figure 1:
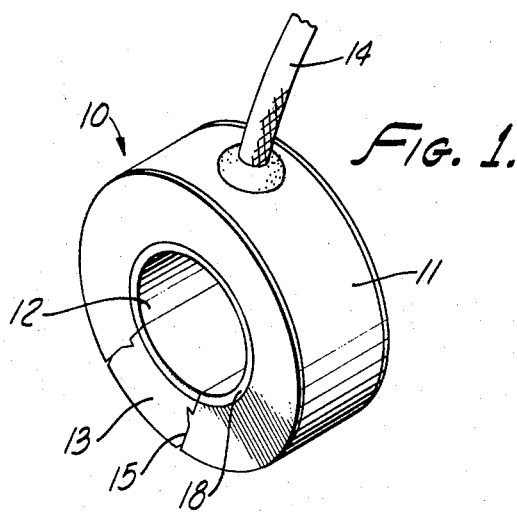
FIG. 1 is a perspective view of the blood flowmeter probe of this invention shown assembled.

Turning now to the drawings and particularly FIG. 1, the probe 10 of this invention is seen to comprise in its major elements a generally cylindrically shaped body 11 having an axial opening 12 through which an artery or other blood vessel under test is arranged. A wedge shaped plug 13 is removed from the main body 11 to provide access for the blood vessel and replaced after the vessel is located within the the opening 12. A cable 14 interconnects the probe with externally located electrical apparatus for energizing power to produce a field across the blood vessel and for processing detected signals, the general operation of which will be described later herein.

Figure 4:
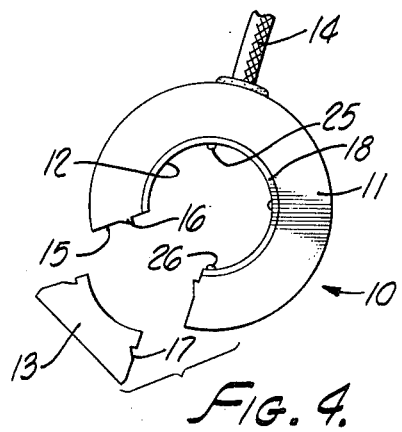
FIG. 4 is a side elevation view of the blood flowmeter probe shown with the access opening plug removed.

As shown best in FIG. 4, the wedge shaped plug 13 when removed from the main body 11 provides a generous access opening 15 via which the probe may be mounted onto a blood vessel. Through the practice of this invention, the opening 15 can be at least as large as 90° of the body 11 and wedge 13. Cooperative action of the ears 16 on the body 11 with similarly shaped grooves 17 in the plug 13 serve to lock the plug 13 within the body 11 during use as is best shown in FIG. 1.

Figure 2:
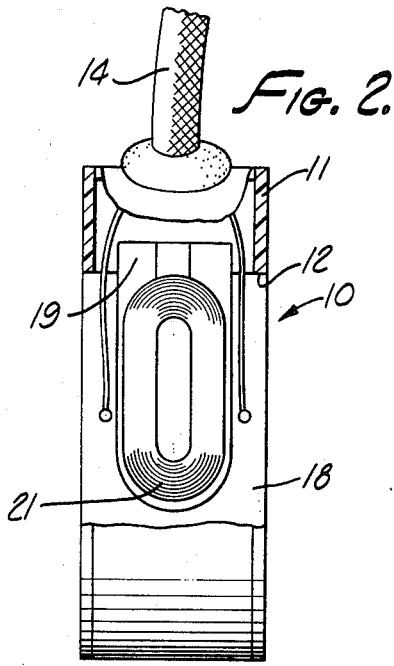
FIG. 2 is a longitudinal sectional view of the probe depicted viewing directly into the auxiliary coils at one side thereof.
Figure 3:
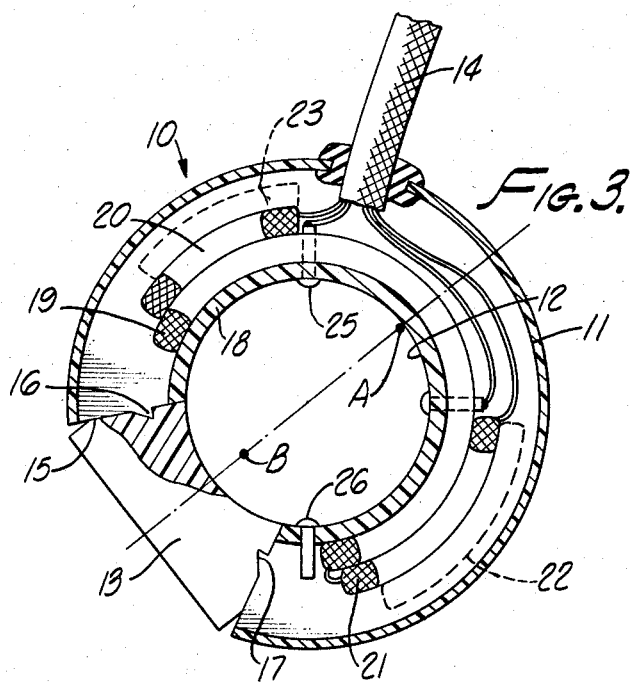
FIG. 3 is a transverse sectional view of the probe.

As depicted in FIGS. 2 and 3, the probe 10 includes a hollow cylinder 18 of an electrically insulative material, having a central opening of sufficient diameter to accommodate a blood vessel under test in a reasonably close fitting relation. A first magnetizing coil 19 is seen on comparison of FIGS. 2 and 3 to consist of an elongated, circularly wound coil which is shaped to conform to the outer surface of the cylinder 18. More particularly, the circumferential extent of the coil 19 about the cylinder 18 is substantially less than 270°, but in excess of 180°.

Relatively flat, circular field reinforcing coils 20 and 21 are provided in overlying relationship to the first coil 19 and immediately adjacent the extremities thereof and shaped slightly from the flat condition to conform to the curvature of coil 19. The circumferential extent of the coils 20 and 21 are substantially identical to each other and in this form of the invention subtend an angle of approximately 90° at the center of the cylinder 18 cross section. It is the primary function and purpose of these coils 20 and 21 to compensate for the non-uniformity of the magnetic field produced across the bore of the cylinder 18 on energization of the coil 19 by reinforcing the field at what would otherwise be regions of low flux density.

With particular attention to the magnetic field intensity as measured at different points across the opening of the cylinder 18, energization of the coil 19 alone produces maximum density at point A and progressively lower flux density on moving along the axis (dashed line) toward the point B. The coils 20 and 21 are appropriately wound and electrically connected to increase the field density at point B and the immediately adjacent regions inwardly of B, thereby providing a highly uniform flux density throughout the entire cross-section of 11 and a blood vessel contained therein.

Although in the described embodiment only two auxiliary coils 20 and 21 are shown, it is considered within the contemplation of this invention to provide further reinforcing coils. For example, in the case of a blood flowmeter probe having an opening 12 of 5 millimeters, one primary coil with two auxiliary coils as shown in FIG. 3 will provide field density uniformity across an enclosed blood vessel to within about 5 percent. For a larger opening 12, of, say, 16 millimeters, a further set of reinforcing coils 22 and 23 is required to obtain the same 5 percent uniformity, which coils are to be arranged so that the coil axes pass substantially through the midpoint of the line A—B, thereby reinforcing the central regions of the field in 12.

More particularly, in practicing this invention to obtain highly uniform fields across relatively large diameter openings (16 millimeters or larger), a first pair of auxiliary coils are located immediately adjacent the access opening, such as the coils 20 and 21 to reinforce the field at point B. In addition, a second set of coils such as 22 and 23, which have their axes shifted toward point A, raises the field in the regions between A and B for the large size opening. It is believed that with a total number of five coils, one primary energizing coil and four auxiliary coils located as described, uniformity of field can be produced across any lumen that is to accommodate a blood vessel to within 5 percent.

In the described embodiments, each of the energizing coils have been depicted as having an air core. However, it may be in certain circumstances where it is desirable to achieve higher magnetic flux intensity levels, that the coils may each include a ferro-magnetic core. In any event, the spirit of the present invention is deemed to exist in both cases, whether the coils include a metal core or an air core.

Figure 5:
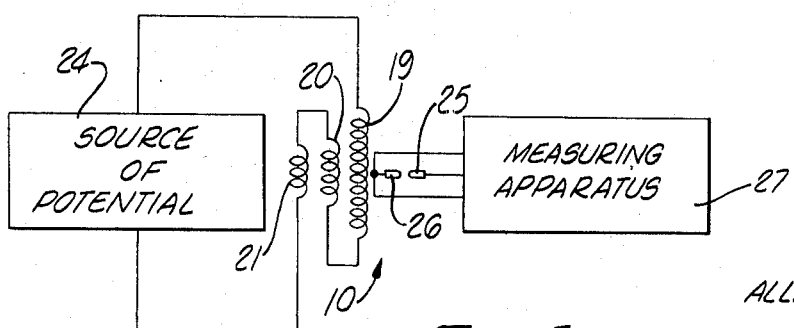
FIG. 5 is a circuit schematic of representative apparatus shown connected with the coils and auxiliary windings of the probe of this invention.

FIG. 5 illustrates a generalized electrical connection scheme for the probe of this invention. A source of driving potential 24 is serially connected with the coils 19, 20 and 21, and, where the additional reinforcing coils are used, serially related to the coils 22 and 23. Electrodes 25 and 26, which contact the blood vessel received within the cylinder or lumen 18, interconnect with suitable measuring apparatus 27. Specific examples of satisfactory apparatus 24 and 27 are described in the aforecited Westersten U.S. Pat. 3,316,762.

What is claimed is:

1. A blood flowmeter probe, comprising:
   a hollow, generally cylindrical body having a removable portion thereof via which the body is mounted onto a blood vessel in surrounding relationship thereto, said removable portion extending less than 90° of said body circular cross-section;
   a first magnetizing winding conformed to the outer surface of the cylindrical body and extending circumferentially thereabout more than 180° and lying outwardly of the region of the removable wall portion; and
   a pair of generally circular magnetizing windings superimposed upon said first winding each at a respective circumferential extreme of said first winding, said circular windings each having a projected area onto said first winding of less than one half of the total areal extent of said first winding whereby said circular magnetizing windings provide individual magnetic fields in the hollow cylindrical body primarily in the region immediately adjacent the removable portion for supplementing the magnetic field provided by said first winding in said region.

2. A blood flowmeter probe, comprising:
   a hollow, generally cylindrical body having a portion thereof removed to enable mounting the body onto a blood vessel in surrounding relationship thereto, said removed portion extending less than 90° of said body circular cross-section;
   a first air-core coil conformed to the outer surface of the cylindrical body and extending circumferentially thereabout more than 180°, but less than 270°, and outwardly of the region of the removed wall portion; and
   a pair of generally circular air-core coils individually superimposed upon said first coil at the respective circumferential extremes thereof, said circular air-core coils each projecting onto said first air-core coil an angular extent substantially less than 90° whereby magnetic field reinforcement substantially solely in the region of the removed portion is effected producing an overall substantially uniform magnetic field throughout the hollow cylindrical body.

3. A probe for being received onto a fluid-carrying conduit to measure fluid velocity therethrough, comprising:
   a hollow, insulative tube, the bore of which is sufficient to receive the conduit therewithin;

said tube including a removable section forming an access opening via which the tube is received on the conduit;

a first air-core multi-turn coil wrapped around the outside surface of said tube and extending circumferentially thereabout between about 180° and 270°;

second and third air-core coils located on said first coil at the respective circumferential extremities thereof, each of said second and third coils having a projected angle less than 90° of said tube cross-section; and means serially interconnecting said first, second and third coils with a common electrical energy source such that said coils are magnetically poled to produce reinforcement of the magnetic field in the region immediately adjacent the removable section whereby a highly uniform magnetic field is produced across the tube bore.

* * * * *